Fig. 1

March 7, 1967  L. U. C. KELLING  3,308,279
ERROR COMPENSATION CIRCUIT FOR CONTROL SYSTEM
Original Filed Sept. 5, 1961  8 Sheets-Sheet 2

FIG. 10

| DECIMAL NUMBER | DECADE STAGE LOGIC STATES | | | |
|---|---|---|---|---|
| | 1-UNIT STAGE | 2 UNIT STAGE | 4 UNIT STAGE | 8 UNIT STAGE |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

FIG. 2

INVENTOR.
LEROY U. C. KELLING
BY James J. Williams
HIS ATTORNEY

INVENTOR.
LEROY U. C. KELLING
ATTORNEY

INVENTOR.
LEROY U. C. KELLING

United States Patent Office 3,308,279
Patented Mar. 7, 1967

3,308,279
ERROR COMPENSATION CIRCUIT FOR CONTROL SYSTEM
Leroy U. C. Kelling, Waynesboro, Va., assignor to General Electric Company, a corporation of New York
Original application Sept. 5, 1961, Ser. No. 136,420, now Patent No. 3,226,649, dated Dec. 28, 1965. Divided and this application Mar. 4, 1965, Ser. No. 438,469
6 Claims. (Cl. 235—151.11)

This invention has to do with electronic automatic control systems, and more particularly with numerical control systems for controlling the motion, in a preferred embodiment, of the cutting element of a machine tool relative to the workpiece in order to describe a contoured or complicated cutting path on the workpiece. This is a divisional application of my co-pending application entitled, "Pulse Train Phase Modulator for Control System," which was filed September 5, 1961, and assigned Serial No. 136,420 which is now Patent No. 3,226,649.

In the class of machine tool control equipment known as "Numerical Contouring Control" systems, the magnitude of the commanded velocity of the workpiece relative to the cutting tool is of great importance at every instant during the cutting operation. Consider, in a metal milling machine, cutting an irregular shape involving a combination of straight lines and circular arcs in the surface of a metallic plate. The optimum velocity with which workpiece and cutting tool move relative to each other in this situation are determined by several limiting factors in addition to the desire to proceed with the operation as rapidly as possible. For example, the thickness of the metal to be cut, the composition of the alloy or compound of which the metal is comprised, the hardness and melting point of the cutting tool, the amount and type of coolant that may or may not be applied to the cutting tool as it cuts through the metal are factors that enter into the consideration of the optimum speed. Too high a velocity of relative motion results in damaging the workpiece, or the cutting tool, or both. In contouring control, therefore, direct and positive velocity control is required at all times.

Of equal importance is control of the path length and direction of the cut or sequence of path cuts. Since contour cutting often involves intricate path shapes, the displacement of the cutting tool relative to the workpiece must be under constant, and carefully predetermined control.

The requirements of contouring control may be considered analogous to some of the modern safety driving tests or races recently developed for both automobiles and pleasure boats. In such races, the course that the vehicle must travel is carefully predetermined and a safe speed is also carefully determined for each leg of the route. The winner of such a race is the one who comes closest to following the prescribed route at the predetermined safe speed.

The predetermined speed, path length and direction for each leg or cut which the machine tool is constrained to follow under the direction or command of a contouring control system is typically fed into the control system in numerical form programmed on punched tape or punched cards, although in certain applications magnetic tape containing the digital information is used. This numerical input data is routed to appropriate sub-systems of the control system, whereupon the control function is set into operation. In order that the numerical information be utilized by the electronic control equipment, the input data must be presented in an electrical form compatible with the overall system and which enables the control system to accurately control the speed and path of the machine tool relative to the workpiece. One form of representation of the velocity and path length data, known in the art, is a train of electrical pulses. In such a representation, each pulse in the train corresponds to a discrete increment of motion of the cutting tool relative to the workpiece, such that if the control system generates X pulses, the machine tool, in obeying the command of the control system, moves a distance of X times the incremental distance defined by each pulse.

In the preferred embodiment, herein subsequently to be described, the incremental distance represented by each pulse is .0001 of an inch. If the control system were to generate 100,000 pulses, for the purpose of determining a path length, then the total motion that would be traversed by the cutting tool relative to the workpiece would be 100,000 times .0001, or 10 inches.

When each pulse represents an incremental distance, the frequency of the pulses, i.e., the pulse repetition rate, defines velocity and may be used to control the speed of motion of the machine tool. This is so, since pulse rate is convertible into increments of distance per unit time. In the preferred embodiment, the length of each cut is commensurate with numbers of pulses, and speed of motion of the cutting tool relative to the workpiece is commensurate with pulse frequency or rate.

A reference or basic source of pulses (a pulse clock) is required for the purpose of generating the pulse frequency which is to be the standard of the system and from which other pulse rates may be generated for use in various parts of the system. Since speed of motion is commensurate with pulse rate in the contouring control system, means must be provided for dividing the reference or clock pulse rate to obtain any desired fraction of that rate in accordance with the commanded speed of motion.

The general organization of the automatic control system comprehends that the path length and velocity commands of the control system are represented by the phase and rate of change of phase, respectively, of a pulse train applied to a servo mechanism which in turn is coupled to, and drives, the machine tool. A sensing mechanism observes the position of the machine tool as the machine tool responds to the command signals, and generates a pulse train whose phase relative to a reference is representative of the present actual position of the machine tool. The phase of the command position signal is compared with the phase of the actual position signal so that an error signal directly proportional to the phase difference may be generated to provide feed back control in the feed back loop of the servo mechanism. The magnitude of the error signal, and its sense or polarity (determined by whether the phase of the command signal leads or lags that of the actual position signal) causes the machine tool to move in such direction as to tend to reduce the magnitude of the error signal.

The same basic pulse rate and phase relative to a reference is provided for the command signal as for the machine tool feed back signal so that, with a commanded velocity of zero and an actual tool velocity of zero, two equal frequency and in-phase pulse rates are applied to the comparison means. This results in a zero difference or error signal, and nothing happens. When the commanded velocity is other than zero, means is provided for continuously changing the phase of the basic pulse signal relative to the reference. Comparison of this phase modulated command pulse train with the phase of the feed back signal of the machine tool which is still at rest will indicate a phase difference increasing in magnitude.

While a numerical contouring system has positive controls, random system errors, mechanical backlash, and similar difficulties inherent in all non-ideal systems, may develop which affect the motion of the cutting tool relative to the workpiece. This is especially probable when the path of the contour to be cut is extremely complicated. Such problems may well develop when circles, in addition to straight lines, are involved in the path. Means are provided in accordance with the principles of the invention to insure that such errors do not have an all pervasive effect on the total operation, but are restricted to a small isolated portion of the total contoured path. To understand the way in which this difficulty develops and how it is neutralized, it should be borne in mind that typically (and most conveniently from a programming viewpoint) each leg or path to be followed by the cutting tool (let us assume for simplicity a path in a single plane) is programmed in punched tape as the "departure" of the leg or path. "Departure" is the distance to be traveled along the path, and is represented as a magnitude, as distinguished from designating a path by the coordinates of its starting and termination points. The X-axis and the Y-axis components of departure are magnitudes used in the computation performed in the control system. The hypothenuse of the triangle defined by the X and Y departures is the overall departure. If at the end of any path cut, the tool is not at the proper coordinates (location), the next succeeding path cut will also be in error, since the programmed departure for the next succeeding cut cannot compensate for the previously generated error. It is, therefore, essential to insure that before commencing on the next cutting step and, therefore, on the next departure, that the cutting tool be in the proper and prescribed location.

When, however, a complicated cutting path, such as a circle, is carried out it may be that at the end of that path the correct X and Y coordinate positions, which are required before the next succeeding path is to be embarked upon, may not be reached exactly simultaneously with the consequent danger of the tool over-shooting along one of the two coordinates. In accordance with the principles of the invention, however, a novel circuit is provided to insure that when there is a difference in the time between which the two components of motion are properly completed, motion along the coordinate first to be properly completed is halted in the control system until motion along the second coordinate is also properly completed as required by the program. In this way, even though an error may creep in at some point in one cutting path, the error is isolated in that one path and cannot be carried along to successive cutting paths.

The novel features which are believed to be characteristic of the invention are set forth with particularity in the appended claims. The invention itself, however, both as to its organization and method of operation, together with further advantages and objects thereof, may best be understood by reference to the following description taken in connection with the accompanying drawings.

NUMERICAL CONTOURING SYSTEM—IN GENERAL

Figure 1:
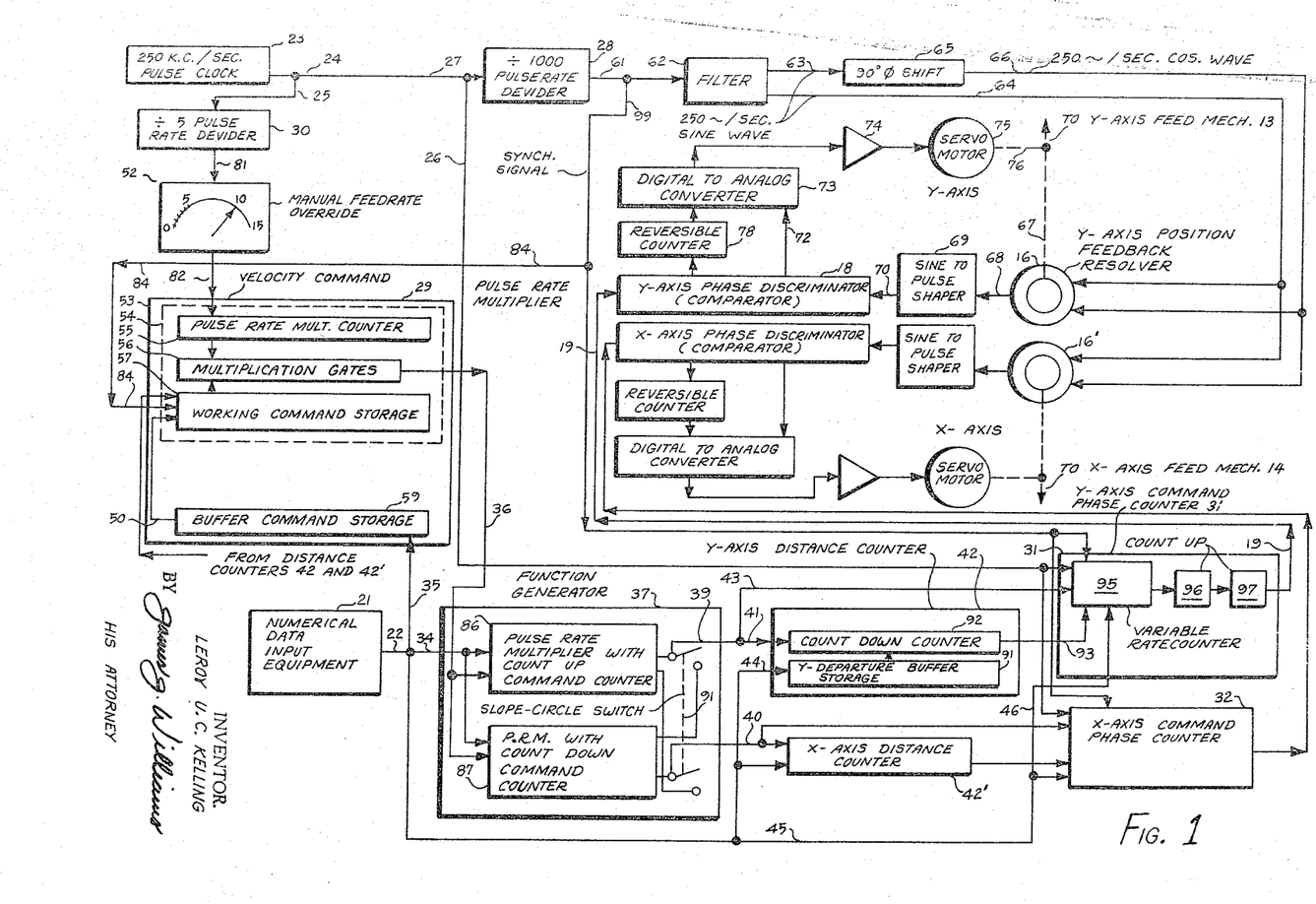
FIG. 1 is a block diagram of a numerical contouring control system which highlights the environment within which the various features of the invention are found.

Referring to FIGURE 1, there is disclosed a general block diagram of the overall numerical contouring control system. FIGURE 1 is presented primarily to show the interrelationship of the three broad sections of the system; they are the machine tool itself, the servo system loop, and the overall electronic control section. The machine tool and the control section are coupled by the servo mechanism loop. The description relative to FIGURE 1 of the overall function of the system, and broad relationship of the sub-systems within these three sections, will provide a basis for more readily comprehending the detailed description of the system arrangement and operation, as well as the detailed logic circuitry of the sub-systems which highlight the various aspects of the invention, and which will subsequently be described in detail.

The numerical contouring control system, as represented in FIGURE 1, may be viewed as comprising three broad sections. The purpose of the entire system, of course, is to control, automatically, a machine tool by a Y-axis feed mechanism 13, and an X-axis feed mechanism 14. Feed mechanisms 13 and 14 comprise appropriate drive shafts and gearing which actuate the machine element for motion along the two coordinates. It is to be understood that the system may be utilized for controlling machine elements in additional coordinates, but to simplify the explanation of the principles of the invention, a description of the third coordinate has been omitted. The machine element may be the cutting tool, itself, or may be the table holding the workpiece which is to be contoured. Alternatively, feed mechanisms 13 and 14 may control both the cutting tool and the motion of the workpiece. For the purposes of this discussion, assume that the machine element represents the cutting tool.

There is a servo loop for each of the two feed mechanisms. The Y-axis servo loop and the X-axis servo loop are structurally independent of each other in their action in driving the feed mechanisms. Since the equipment throughout the system for the X coordinate is precisely the same as for the Y coordinate, solely the Y coordinate system will be described, except where a discussion of the equipment of both coordinates is required for clarification. The Y-coordinate servo loop comprises a Y-axis position servo, including a D.C. amplifier driving a servo motor 75 which actuates the Y-axis feed mechanism 13. Simultaneously, the motor 75 drives the Y-axis position feed back synchro resolver 16. The output of the position feed back resolver 16 provides an electrical representation of the position of the machine in the Y-coordinate since both the feed mechanism 13 and resolver 16 are driven in common by the position servo motor 75.

The resolver 16 is coupled to the Y-axis phase discriminator or comparator 18. The discriminator's function is to compare the actual position of the machine in the Y-coordinate, as represented by the Y-axis position feed back resolver 16, on the one hand, with the commanded position from the control section. Thus, the phase of the command signal entering the Y-axis phase discriminator 18 from the left on lead 19 is compared with the phase of the actual feed back position signal which comes into discriminator 18 from the resolver 16. The difference in the phase between the command signal and the feed back signal is commensurate with the difference between the commanded position and the actual position. This phase difference is utilized for generating an error signal which is then fed into the servo mechanism. The servo mechanism drives the Y-axis feed mechanism in accordance with the instantaneous error signal. The servo mechanism loop, therefore, comprises the Y-axis position servo, the Y-axis position feed back synchro resolver 16 and the Y-axis phase discriminator 18. Discriminator 18 is also common to the control section now briefly to be outlined.

The input to the control section of the overall numerical contouring control system is the numerical input data equipment block 21 which accepts numerical command data. Input equipment 21 may be a punched tape, punched card, or magnetic tape, digital input sub-system. For the purposes of the numerical contouring control system under discussion, punched tape has been found to be particularly advantageous. Numerical input data equipment 21 reads the instructions and addresses on the input tape so as to generate the appropriate electrical signals requisite for controlling the machine element. Typically, the numerical input information is in a coded digital form related to the speed with which the cutting element is to travel while performing its contouring function; it also indicates the X and Y departures and their direction for that cut, or the arc center offsets of the circular path to be generated if that particular cut is to be an arc of a circle. The instructions from input equipment 21 are then routed throughout the control section in accordance with the programmed addresses.

Another type of input is also provided for the control section in the form of a train of pulses generated from a reference clock or oscillator 23. This pulse clock, as is well known in the digital computer art, provides the carrier by which the command signals are transported throughout the control section; it also provides a reference pulse rate input to the servo loop section. Thus, the output of the pulse train generator or clock 23 is applied along its output lead 24 to both the control section of the contouring system along leads 25 and 26, and also to the servo loop section on lead 27. Lead 27 is coupled to the input of the position feed back resolver 16 through the intermediary of a pulse rate divider 28, while the output from clock 23 is applied to the control section on lead 25 as an input to the velocity command block 29, through the intermediary of the pulse rate divider 30. There is no pulse rate divider in lead 26 between clock 23 and the Y-axis command phase counter 31. The insertion of pulse rate divider 30 in lead 25, and divider 28 in lead 27, as well as the absence of a pulse rate divider in lead 26, result in adapting the reference pulse rate from clock 23 for use in different parts of the system having different functions and operating characteristics.

The pulse rate fed into the control section, and the total number of pulses fed into the control section for for any given path, define the commanded velocity with which it is desired the machine tool shall move and the total length of the path it is desired that the machine tool traverse. In short, the pulse rate and the total number of pulses are the mechanisms upon which the electronic equipment in the control section operate to provide command signals, subsequently to be converted into the velocity and distance of travel executed by the machine tool.

The function of the velocity command block 29 is to convert a reference pulse rate entering from the pulse rate divider 30 into a pulse rate represented by a number (commensurate with required velocity of motion) punched into the input tape and fed into the system at input data equipment 21. This number is referred to as the feed rate number.

The feed rate number is therefore applied from input 21 along leads 22 and 35 as another input to the velocity command 29. If the punched tape commands a feed rate number of 200 inches per minute, the velocity command 29 would operate upon the pulse rate to provide an output pulse rate on lead 36 of 33.3 kilocycles per second (which is equal to 200 inches per minute with each pulse representing .0001 of an inch). Velocity command block 29 also performs the very important functions of manual feed rate over-ride and automatic acceleration and deceleration. The output pulse rate, commensurate with command velocity, is applied on lead 36 to the function generator 37.

The function generator 37 operates in two modes. The first mode generates command signals for straight line cuts at any angle, sometimes referred to as slope generation or linear interpolation. The second mode generates command signals to perform circular line cuts with a specified radius, also referred to as circular interpolation. For the purposes of discussion relative to FIGURE 1, consider function generator 37 in its relationship to the rest of the system operating solely in the first mode as a slop generator.

Function generator 37 resolves the command velocity entering on lead 36 into two component pulse rates commensurate with required velocities in the X and Y directions. This resolution is performed in accordance with the X and Y departures programmed into the punched tape and applied to the function generator 37 from input equipment 21 along the leads 22 and 34. Thus the input pulse rate to function generator 37 is multiplied by a factor which is directly proportional to the sine of the slope angle of the path cut relative to the X axis to obtain the required Y component of velocity, and is multiplied by the cosine of that angle in order to obtain the required X component of velocity. The X and Y outputs of function generator 37, therefore, are two pulse rates commensurate with the Y and X components of velocity required for the motion of the cutting tool. The X and Y pulse rates are applied as outputs on lead 40 and 39, respectively. Between 39 and 40 and the X and Y feed mechanisms 13 and 14 of the machine tool, the circuitry for handling the output on lead 39 is identical to that for the output on lead 40. Accordingly, the following discussion will be restricted to the Y coordinate system.

The Y pulse rate output on lead 39 from the function generator 37, is applied to two different circuits, simultaneously. Along lead 41 from lead 39, it is applied to the Y-axis distance counter 42, while along lead 43 from lead 39, it is applied to the Y-axis command phase counter 31. Distance counter 42 controls the length of the path along which the machine travels for the cut being made. Command phase counter 31 controls (relative to the position feed back resolver 16 through the intermediary of the discriminator 18) the velocity of motion of the machine for the cut.

Since each pulse represents an incremental distance which the cutting tool travels, counting the pulses in distance counter 42 that exit from function generator 37 is the same thing as measuring the distance which the cutting tool travels along the path. When counter 42 totals a number of pulses equal to the desired path length, its operation stops as does the movement of machine tool cutting element. Counter 42 is informed at the beginning of each path, as to the total count required to achieve the desired path length. This input data is applied to counter 42 from input equipment 21 along leads 22 and 44.

The motion of the machine tool is controlled in the command phase counter 31. In command phase counter 31, not only is the required Y coordinate pulse rate applied thereto along lead 43, but the reference clock pulse rate is also applied as an input from clock 23 along leads 24 and 26. Consider what happens if the Y feed rate command requires no motion in the Y direction, and the simultaneous condition that the machine tool is at rest in correspondence with the command. Under these circumstances, the pulse rate output from function generator 37 on lead 39 is zero, thereby maintaining a constant phase on the phase modulated pulse train output from phase counter 31. Both phase counter 31 and resolver 16 are adapted to provide outputs which are of precisely the same pulse rate, and in phase, under these conditions. Accordingly, there is a zero error signal output from phase discriminator 18 and the cutting element remains motionless. However, if a pulse rate output from function generator 37 does appear on leads 39 and 43, and therefore a pulse train representing a commanded velocity is fed into command phase counter 31, then the pulses on lead 43, as well as the clock pulses on lead 26, are counted by phase counter 31. If the direction of motion commanded by the programmed tape is in a negative direction, the pulses on lead 43 are subtracted from the clock pulses in the command phase counter. Whether the direction is positive or negative with respect to the Y coordinate, it is indicated to command phase counter 31 by a signal applied from the input equipment 21 along leads 22, 45 and 46. The addition or subtraction of pulses in the command phase counter 31 has the net effect of either advancing or retarding the phase of the output pulses from the phase counter on lead 19, respetcively, relative to the output pulse train from the synchro resolver 16. Accordingly, the position servo drives the Y-axis feed mechanism in the appropriate direction and at a rate proportional to the error signal developed in discriminator 18. As Y-axis feed mechanism 13 continues its motion, it will eventually traverse the entire distance required for the specific cutting operation. When this distance is completed, it is recognized in the Y-axis distance counter 42 and a blocking signal is generated therefrom along lead 93. This blocking signal is applied to command phase counter 31 in a manner so as to stop the input thereto from function generator 37. When this happens, pulse rate signals can no longer be added to the clock pulse rate in command phase counter 31, with the result that the phase of the output from phase counter 31 can no longer be changed.

FUNCTION GENERATOR, DETAIL

Before describing the detailed logic of the function generator circuitry, it is worthwhile to reconsider the purpose that the function generator serves within the framework of the entire control section.

As discussed hereinbefore, the velocity command 29 operates responsive to a command input from the numerical input data equipment 21 and control pulses from the manual feed rate over-ride 52 to yield a velocity command signal on lead 36 consisting of a plurality of pulses and having a frequency commensurate with the velocity of a desired cut. Basically, as shown in FIG. 1, the velocity command 29 comprises a pulse rate multiplier 54 having pulse rate multiplication counter 55, which counts the input pulses coming from the manual feed rate over-ride 52; working command storage 57, which stores the command data supplied by numerical data input equipment 21; and multiplication gates 56, which develop the velocity command signal on lead 36 under the control of PRM counter 55 and working command storage 57.

Data input from tape equipment 21 to velocity command 29 and in particular to PRM 54, is through the intermediary of the buffer command storage register 59 located in velocity command 29. Buffer command storage 59 holds the new command until completion of the previous block of punched tape commands. Upon this completion, the data in buffer storage 59 is transferred to working command storage 57 over lead 50. Upon completion of this transfer, the data input section 21 again functions to reload buffer command storage 59 with instruction from the next following block of punched tape data.

Function generator 37 operates responsive to the velocity command signal from velocity command 29 to deliver command signals consisting of pulses having a frequency commensurate with the velocity of the X and Y motion required to develop the desired velocity of cut along a particular contour. In other words, function generator 37 delivers output signals representative of the X and Y components of the command velocity. Of course, the instant disclosure concerns itself only with motion in a single plane and extension of the teachings herein to three-dimensional motion may be performed by one with normal skill in the art.

In general, devlopment of component velocities for ultimate control of the X-axis and Y-axis feed mechanisms is accomplished by multiplying the command velocity signal on lead 36 from velocity command 29 by a number commensurate with either the direction sine or the direction cosine of the instantaneous slope of the cut. For a straight line, these multipliers are constant because the slope is constant, whereas for a circular contour, the multipliers continuously vary because the slope varies continuously. From the standpoint of the multiplication operation performed, function generator 37 comprises two pulse rate multipliers similar to the type considered in conjunction with velocity command 29. A detailed logic drawing of the elements in function generator 37 is presented in FIGS. 3 through 7 when taken as shown in the sheet layout of FIG. 7A.

The function generator 37, shown in FIGS. 3 through 7, consists of two pulse rate multipliers both functioning from a single pulse rate multiplier counter 404 whose input is the command velocity on lead 36 from velocity command 29. The working command storage registers for these pulse rate multipliers are in the form of a count-up counter 402 and a count-down counter 406. As in the case of the velocity command PRM 54, buffer storage registers 401 and 407 are provided between the numerical data input equipment 21 and command storage registers 402 and 406 respectively.

PRM counter 404 contains five binary-coded-decimal decades 410–414 arranged to register a maximum decimal count of 99,999 in response to input pulses from velocity command 29 on lead 36. Each decade of PRM counter 404 consists of four bistable stages weighted respectively 1–2–4–5. Command storage registers 402 and 406 each comprise five binary-coded-decimal decades 425–429 and 430–434, arranged to register a maximum decimal number of 99,999. As in the case of the velocity command PRM 54, the decades of the command storage registers consist of four bistable stages weighted respectively 1–2–4–8. The interaction of the numbers stored in the command storage registers 402 and 406 with the number counted in PRM counter 402 due to the influence of multiplication gates 403 and 405 is similar to that previously described in connection with operation of the PRM 54 of velocity command section 29. The specific details of multiplication gates 403 and 405 are not repeated here, because they are fully covered hereinbefore. It is sufficient to understand that the output signals from multiplication gates 403 and 405 on count-up summation line 454 and count-down summation line 455, represent the component velocities required for machine control. These signals are applied to subsequent X and Y-axis control circuitry.

It is important to recognize that command storage registers 402 and 406 are straight count-up and count-down counters respectively, rather than the reversible counter employed in the velocity command PRM 54. The decreased complexity achieved by such substitution is an important feature of the invention. The interaction of the various logic elements, the unique contribution to circular motion generation afforded by the use of count-up and count-down counters in conjunction with gating circuitry to permit generation of circles over an entire 360 degree range, and the unique features for preventing errors due to circle function overflow, will be more fully understood after a detailed examination of the logic.

First, however, consider the operations required for linear and circular interpolation.

Linear interpolation

The input pulses from velocity command 29 on line 36 are applied as gating pulses to pulse rate multiplier counter 404 and are counted upon occurrence of a clock pulse on line 81. The clock pulses are extracted from the output of divide-by-five pulse rate divider 30 in FIG. 1, and consequently occur at 50 kilocycles/second. Thus, PRM counter 404 counts up in response to each concurrent occurrence of a clock pulse and gating pulse from velocity command 29. Upon each count, PRM counter 404 applies discrete pulses to multiplication gates 403 and 405, depending upon the count registered. These discrete pulses are gated to output summation lines 454 and 455 in accordance with the numbers stored in command storage registers 402 and 406 respectively.

For generation of slope motion at any desired angle with respect to the machine axes, both command storage registers 402 and 406 are supplied by a number other than zero. Thus, a definite pulse rate appears on both output summation lines 454 and 455. For contouring along either the X or Y axis of the machine, a maximum command of 99,999 is inserted in the command storage register of the appropriate half of the function generator, and 00,000 is inserted in the other. Insertion of these commands will cause one of the multiplication gates to respond to 99,999 out of each 100,000 of the input gate pulses from velocity command 29 and pass on a pulse train to command phase counter 31 or 32 which will cause the feed mechanism associated with the appropriate axis to move at substantially the velocity commanded by the velocity command signal. The other multiplication gate will block all pulses.

There are three basic ways of commanding the function generator to generate a slope: (1) the direction sine and direction cosine of the slope path may be inserted in the count-up and count-down command storage registers respectively; (2) the X and Y departure distances may be inserted in the count-up and count-down command storage registers respectively; and (3) multiples of the X and Y departure distances may be inserted in the count-up and count-down command storage registers respectively. A brief consideration of each of these approaches will serve to illustrate their respective merits.

Multiplication of the velocity command signal on lead 36 by numbers equivalent to the sine and cosine of the slope angle to be cut will self-evidently yield two signals representative of the X and Y components of the commanded velocity. Thus, for a 45 degree slope, the two commands will both be 70,711. The output pulse rates on summation lines 454 and 455 will then be approximately 71% of the input pulse rate and will produce resultant velocities along the two axes which will add together vectorially to develop the commanded velocity along a 45 degree slope. A switch, or gate, 463, appearing in FIG. 7, directs these velocity signals to the appropriate control circuitry in accordance with which command register contained the particular sine or cosine numbers. The functioning of gate 463 will be explained in detail in conjunction with the subsequent detailed explanation of circular interpolation.

It should be recognized that the numbers stored in command storage registers 402 and 406, determine only the slope and velocity of cut. In order to limit the length it is necessary to supply further instructions to Y-axis distance counter 42 and X-distance counter 42′. The required distance information is incorporated in each block of instructions as the Y-axis departure and X-axis departure. Routing circuitry associated with numerical data input equipment 29 directs the departure information to the correct distance counter. As output pulses appear on summation line 454 and 455 they are directed by gating circuit 463 to the appropriate distance counter. Each output pulse causes the associated distance counter to count down by one decimal digit until all stages register zero. At this time, the desired departure has occurred and further component velocity command signals from the function generator are blocked from the associated command phase counter, thereby terminating further operation in the direction controlled by the zeroed counter. When both distance counters register zero, the next block of instructions is read into the equipment.

In some instances, the departure information is used to control the slope and velocity generation directly, rather than resorting to the direction sine and cosine of the slope angle. Under these circumstances, the departure numbers are inserted into command storage registers 402 and 406. The reason departure distances may be directly inserted in the command storage registers is because in order to generate a particular slope it is merely necessary that the two pulse rates on summation lines 454 and 455 have a particular definite ratio between them. A factor that arises when using departure distances, rather than values of the sine and cosine, is that the resultant vectorial velocity of both X-axis and Y-axis motion is less than the commanded velocity on lead 36. This may be illustrated by a simple example. If it is desired to go a total distance of four inches on both the X and Y axes (X and Y departure both equal to 4.0000 inches), a number of 40,000 would be stored in both the count-up and count-down command registers 402 and 406. These commands would develop equal pulse rates on both summation lines 454 and 455 until the distance counters indicated that signals representative of four inches of travel had been generated. The cut executed would be at the correct slope; however, the resultant velocity of cut would be in the ratio of 40,000/70,711 to the commanded velocity. This is because if the direction sine and cosine had been registered, the number in the registers would have been 70,711.

In order to obtain the original desired velocity when using X and Y departure information directly, it is necessary to employ a velocity command which is the desired velocity times the inverse of the aforecited ratio. In other words, when departure information is used directly in the command registers, the command velocity should be calculated in accordance with the formula:

$$V_c = \frac{10 \times V_d}{L}$$

where $V_c$ equals the command velocity inserted on the input data tape, $V_d$ equals the desired velocity of cut, and L equals the slant length of the path.

An advantage inherent in using departure information directly, is that it permits the elimination of distance counters. When the departure numbers are inserted in command storage registers 402 and 406 the application of 100,000 gating pulses to PRM counter 404 will result in producing the same number of pulses on each summation line as the number stored in the associated command register. The generated pulses will thereupon command motion in accordance with the exact departure. Of course, the elimination of distance counters requires that PRM counter 404 complete an entire cycle for each slope, whereas using distance counters permits the termination of a cut at any time a desired length is attained, thereby affording recycling without waiting for a complete counter cycle.

For relatively short paths and high contouring velocities, or combinations of the two, the calculated command velocity may be in excess of that normally available, due to the particular timing clock employed. This difficulty may be overcome either by using the direction sine and direction cosine in the manner mentioned above, or by multiplying the departure distances with a constant factor while reducing the originally calculated command velocity number by the same factor until it becomes less than the maximum permissible. When the latter technique is used, the multiplied departure values are inserted in the command storage registers 402 and 406, and the actual departure values are inserted in X-axis and Y-axis distance counters 42' and 42.

*Circular interpolation*

In order to generate circular tool center paths (perform circular interpolation), the function generator circuitry is modified by feeding the output pulse rates on summation lines 455 and 454 through a cross-coupling connection to the inputs of count-up and count-down command registers 402 and 406 respectively. In circular function generation, this cross-connection causes count-up counter 402 to increase in digital value from its initial number in accordance with the output on count-down summation line 455 and causes count-down counter 406 to decrease in digital value from its initial number in accordance with the output on count-up summation line 454. The resulting outputs that are delivered to subsequent control circuitry continuously vary in frequency. An appreciation of why this action develops circular motion in the feed mechanisms may be had by considering the nature of the signals involved.

The velocity of motion between tool and work piece at a zero degree position when generating a counter-clockwise circle will be entirely in the Y-axis. As the cut proceeds through the first 90 degrees of circle generation, the X component of the total velocity varies as the function of the sine of the instantaneous angle whereas the Y component varies as a function of the cosine of this angle. When the 90 degree position has been attained, the Y component of the velocity has been reduced to zero and X component of the velocity is equal to the total velocity. In other words, the X velocity varies from zero to a maximum in accordance with a function of the sine of the position angle and the Y velocity varies from a maximum to zero as a function of the cosine of the position angle. By controlling the information stored in command storage registers 402 and 406 in accordance with these sine and cosine functions of the position angle it is therefore possible to modify the velocity commands to both the X and Y axis feed mechanisms in order to generate circular motion.

Storage of a number in count-up command register 402 equivalent to the radius of the desired circle times the sine of the angle in the first quadrant at which the circle generation is to commence, and storage of a number in the count-down command register 406 that is equal to the radius of the desired circle times the cosine of the angle in the first quadrant at which the circle generation is to commence, will enable the function generator to initially generate command signals on count-up and count-down summation lines 454 and 455 respectively commensurate with the required component velocities at that particular angle and due to the described cross-connection to continuously generate signals to develop a circular cut in the first quadrant. The reason for this, lies in recognition of the fact that $\int \sin \theta d\theta = -\cos \theta$ and $\int \cos \theta d\theta = \sin \theta$. This being so, the cross-connection is effective to integrate the stored numbers with respect to time and add or subtract the results respectively to the numbers in the opposing registers. Thus, the stored numbers ($R \sin \theta$ and $R \cos \theta$) are integrated and due to their effect via the multiplication gates upon the incoming velocity command pulse rate on lead 36, the component velocity commands appearing on summation leads 454 and 455 are effective to cause the tool feed mechanisms to generate a circle.

It should be recognized that the described operation related to the counter-clockwise generation of a circle in the first quadrant only. The relationships described, i.e., the Y component of velocity being a function of the cos $\theta$ and the X component of velocity being a function of the sin $\theta$, are applicable under the described conditions only. As each quadrant is considered the particular trigonometric relationship varies. Also, within each quadrant the trigonometric relationship varies with the rotational direction of generation. At times the X component of velocity varies as a function of the sine while the Y component of velocity varies as a function of the cosine, and vice versa.

Figures 7, 7A:
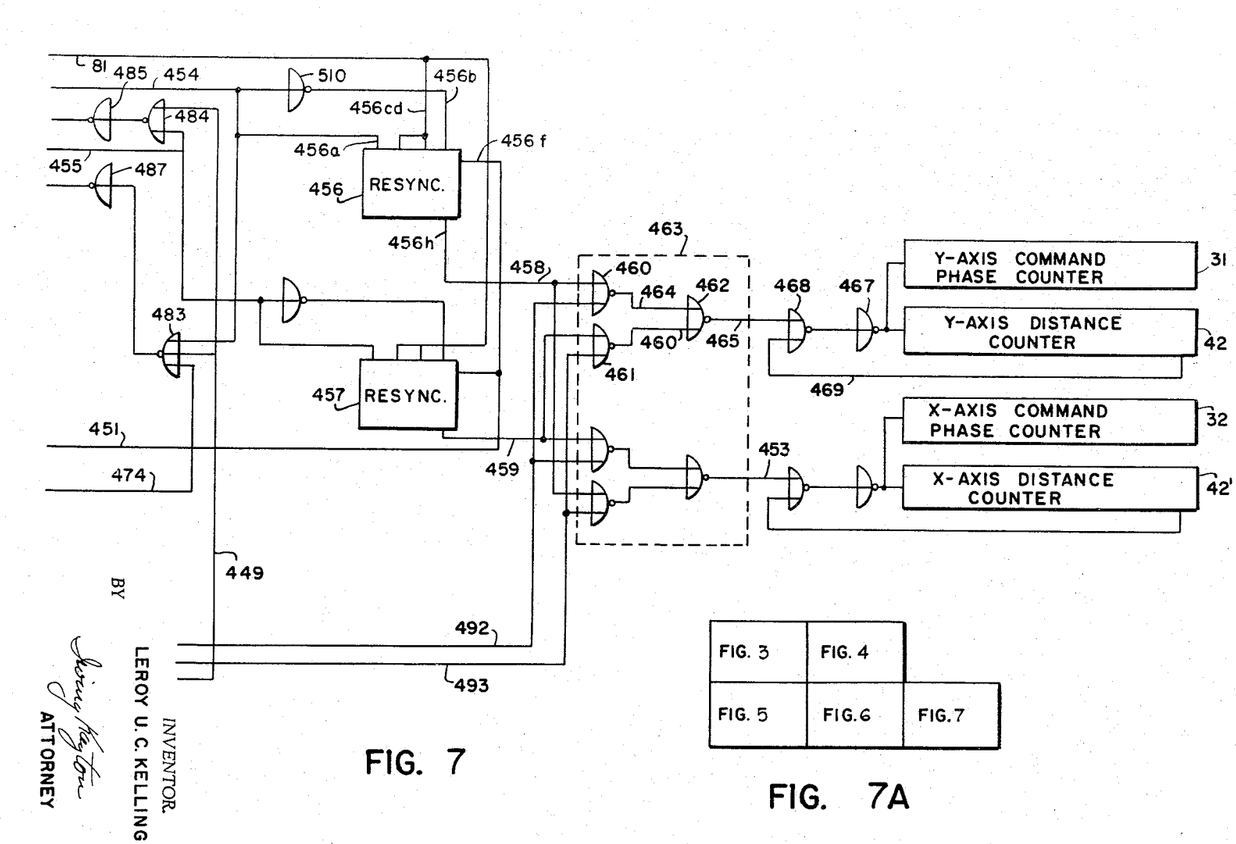

In order to generate a complete circle it is necessary to selectively store the command information for each quadrant of cut in the correct command storage register. This selective storage requires recognition of the quadrant and direction of generation for each rotational cut made. Reference to the "Program Manuscript," set forth hereinbefore, will show that this information is presented for each block of data. The particular operations performed in response to the mentioned data will be developed more fully in the following discussion. However, it should be understood that because the component velocities for the X and Y axis feed mechanisms will appear on either the count-up or count-down summation lines 454 or 455, in accordance with the particular sector of a circle being generated, gating means 463 in FIG. 7 are provided.

Gating means 463 are responsive to the direction of circle generation and the quadrant involved, to connect summation lines 454 and 455 to the appropriate axis control circuits. The addition of gating means 463 and other gates described subsequently, permit the use of simple straight count-up and count-down counters whereas reversible counting techniques had to be used in the past. Elimination of the complexities inherent in reversible counting results in the elimination of costly components subject to failures.

During circular interpolation count-down counter 406 counts toward zero and count-up counter 402 counts toward the radius numbers. Circular function generation can be started at any angle by using proper initial commands and terminated at any angle by setting distance counters 42 and 42' to count down to zero upon relative movement of the tool piece a specified amount.

When discussing linear interpolation it was indicated that it was not necessary to use the sine and cosine values directly, but rather, departure information could be inserted in command storage registers 402 and 406. In the case of circular interpolation, it will be recognized by considering FIG. 2 that the radius times the sine of the position angle is represented by the X Arc Center Offset data $J_D$ and that the radius times the cosine of the position angle is represented by the Y Arc Center Offset data $K_D$. Thus, these values may be inserted directly into the command registers. In order to develop the necessary command velocity to obtain a desired velocity of cut, the following formula, similar to that already considered for the linear interpolation, should then be used:

$$V_c = \frac{10 \times V_d}{R}$$

where $V_c$ equals the velocity feed rate number command, $V_d$ equals the velocity desired in inches per minute, and R equals the radius of the circle path in inches.

*Specific operations*

A complete understanding of the operation of the function generator during linear and circular interpolation may best be understood by considering several examples. Such examples are available in considering the sequence of events required to develop the cut from point B to point D in the contour illustrated in FIG. 2. The specific items of data placed upon the tape and available as outputs from the numerical input data equipment 21 to generate the straight line and circular contours from points B to D are as follows:

| From Data Point | Data to Point | Program Selection | X Departure | Y Departure | Y Arc Center Offset | X Arc Center Offset | Feed Rate Number |
|---|---|---|---|---|---|---|---|
| B | C | g1 | x+6.0000 | y+1.7500 | | | f016 |
| C | D | g3 | x+2.5000 | y+3.7500 | k3.7500 | j1.5000 | f025 |

The control data impressed upon the input data tape supplied to numerical input data equipment 21 includes a letter address which directs the particular binary-coded information directly following it on the tape to the proper portion of the control system. For example, a discrete letter address precedes the feed rate information representative of the command velocity, for directing it to the buffer command storage 59 of velocity command 29. Similarly, a discrete letter address precedes the departure information, directing it to the appropriate X-axis and Y-axis distance counters. Further, letter addresses dictate the appropriate buffer command storage units in the function generator to which departure information is to be directed.

A distinction exists, however, in the function generator directing circuitry when the program selection indicates that circular interpolation will occur. As mentioned, the particular command register 402 or 406 used to control X or Y command signal generation is determined by the direction of circle generation and the quadrant involved. Thus, the X and Y Arc Center Offset data is selectively stored in up-counter buffer command storage 401 or down-counter buffer command storage 407 in accordance with the direction of generation and quadrant information.

Control circuitry to direct the control data is illustrated by block 490 in FIG. 18. Lead 491, connecting the control circuitry to numerical input data equipment 21, is indicative of the control exerted thereby in response to the command information. As more fully described hereinafter, the five output leads 447, 443, 449, 492, and 493 have signals impressed thereon in accordance with the requirements of circular interpolation. The presence of a binary "0" on either lead 447 or 443 serves as a letter address indicating that the succeeding digital information is to be stored in up-counter buffer storage 401 or down-counter buffer storage 407 respectively. The presence of a binary "0" on lead 449 indicates that circular interpolation is contemplated and, therefore, the count-up and count-down command registers 402 and 406 should be interconnected. Finally, the presence of a binary "0" on either lead 492 or 493 indicates which output summation line, 454 or 455, should be connected to which axis control circuitry. The signals appearing on leads 492 and 493 are always complementary.

Function generator operation in response to the linear interpolation data covering points B to C is relatively simple and will now be considered. Because the function generator is essentially two similar pulse rate multipliers, consideration of the lower portion only, will furnish a complete understanding of the operation.

A plurality of transfer leads 441, 442, 444, and 448 interconnect each decade of the buffer storage unit 407 with numerical data input equipment 21. These leads are selectively energized in accordance with the information on the input tape to reflect the binary states required in a 1–2–4–8 code to store a particular decimal digit in each decade. When the letter address g1, indicative of linear interpolation is read, the subsequent appearance of the letter address for the X departure data (6.0000) energizes lead 443 and enables buffer command storage 407. A signal on reset lead 440 thereupon resets all buffer storage decades, 435 to 439, to zero in preparation for storage of new data. Then, as successive lines of data from the input tape energize transfer leads 441, 442, 444, and 448, row sort leads 435–1, 436–1, 437–1, 438–1, 439–1 are selectively energized to gate the successive decimal digits into their associated decades 435–439. The described transfer of data from numerical data input equipment 21 to buffer storage 407 is similar to such transfer into any other buffer storage unit.

When all command buffer storage units have been set to register the commands for the cut from point B to point C, and the preceding cut has been completed, three transfer signals are generated. The transfer signal generation means is represented by block 494 in FIG. 3, and the nature of each of the signals as functions of binary value and time is shown therein. The "transfer blocking" signal 495, is first to occur, and provides a binary "1" on lead 450 for a duration of time which includes the occurrence of the other two signals. The "transfer reset" signal 496, provides a binary "1" on lead 451 a short time after occurrence of the transfer blocking signal. The "transfer" signal 497, provides a binary "0" on lead 452 upon termination of transfer reset signal 496. The information contained in buffer command storage 401 and 407 is transmitted to command registers 402 and 406 in response to the transfer signals. In addition, PRM counter 404 is reset to zero.

Figure 8:
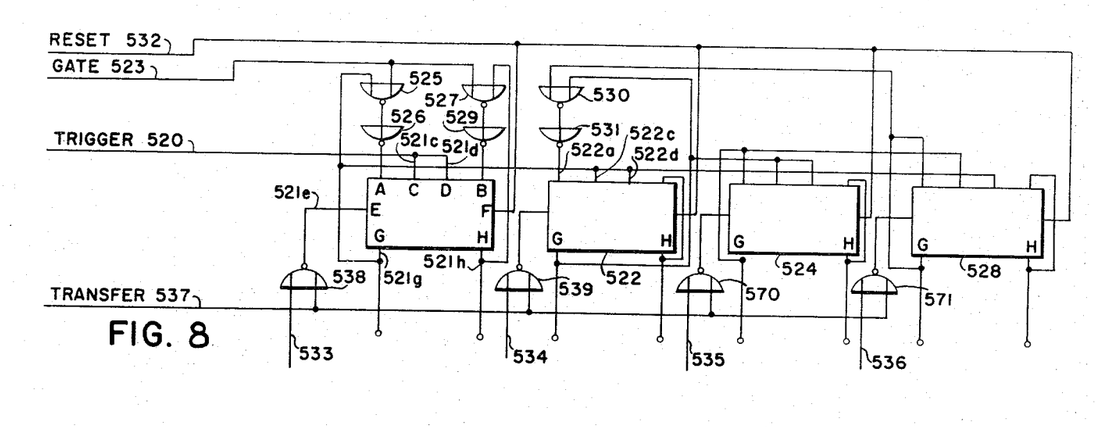
FIG. 8 is a logic representation of a typical count-up binary-coded-decimal counter.
Figure 9:
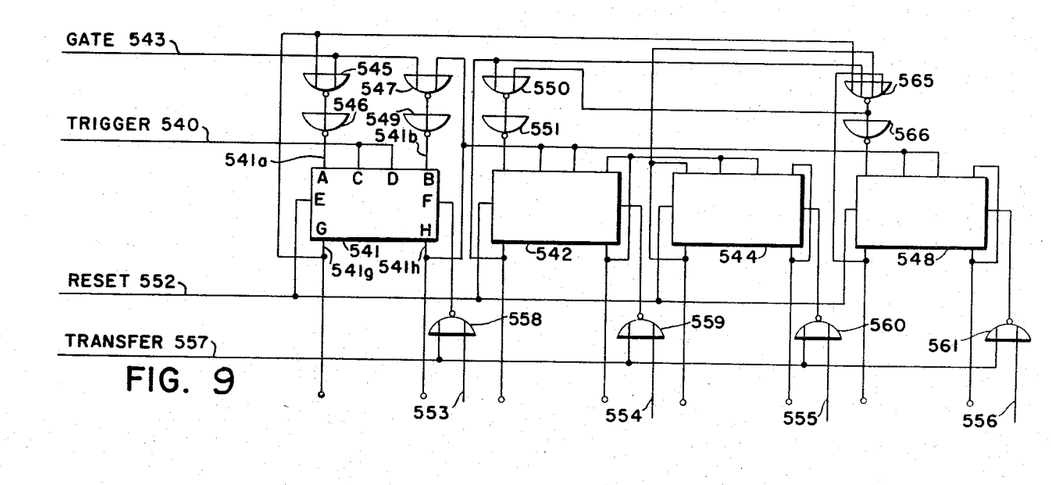
FIG. 9 is a logic representation of a typical count-down binary-coded-decimal counter.

Typical count-up and count-down command storage registers are illustrated in FIGS. 8 and 9 respectively. Their operation will be considered subsequently. Several characteristics should be recognized, however, to proceed with a consideration of the function generator. Each command storage register 402 or 406 comprises a plurality of decades. A typical count-up decade, 425 in FIG. 3, comprises four bistable stages 501, 502, 504, and 508 arranged to count up pulses appearing on lead 496 in accordance with a 1–2–4–8 binary-coded-decimal form. Upon reaching a decimal count of 10, a carry pulse is delivered on lead 499 to either another decade or some other recognition circuit (in this case, "one recognition flip-flop" 470). A gating arrangement is provided in conjunction with the first bistable stage to prevent the decade from counting unless a binary "0" is applied to the gating input on lead 498. Means are also provided for setting the entire decade to zero in response to a signal on lead 507 and for setting the individual stages in accordance with the number stored in its associated buffer storage in response to a signal on lead 500.

The individual decades of count-down command register 406 are similar to decade 425, just described, except that they count down from 9 to 0 and provide a "carry" pulse when going from 0 to 9.

Figure 2:
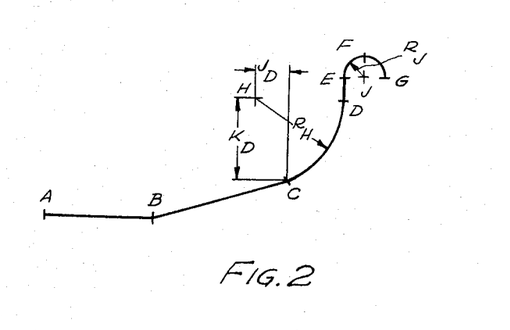
FIG. 2 is a curve representative of an illustrative shape that may be automatically cut in a workpiece under control of the automatic apparatus of the invention.

Returning to function generator operation, upon storage in bucer storage units 401 and 407 of the data corresponding to the slope commands for the cut from points B to C in FIG. 2, it will now be understood that "transfer blocking" signal 495 will be generated. This signal is applied to all but the least significant decades of PRM counter 404, up-counter 402, and down-counter 406. This prevents counting by effectively inhibiting the gating inputs. Immediately following the transfer blocking signal, "transfer reset" is implemented by signal 496 on lead 451. The transfer reset signal is applied to all decades of all counters. The transfer reset signal sets all stages of count-down register 406 to binary "1" and all stages of count-up register 402 and PRM counter 404 to binary "0." This difference in settings, is of course due to the difference in the "carry" signal in the various registers. Once resetting is completed, "transfer" signal 497 on lead 452 enables each stage of up-counter 402 and down-counter 406 to assume the state commanded by its associated buffer storage unit.

Upon completion of the above operations, the function generator is set and ready to operate in response to velocity command pulses from velocity command 29 over input lead 36. As pulses are received from velocity command 29, they are applied directly as a steering gate to decade 410 of PRM counter 402 and to multiplication gates 403 and 405. As described in conjunction with the velocity command section 29 the decades of the multiplier reference counter respond to the 50 kilocycle clock pulses appearing on lead 81 whenever an input gate signal from velocity command 29 appears on lead 36. Thus, pulse rate multiplier reference counter 404 begins counting from zero at a rate determined by velocity command 29. In accordance with the numbers stored in the up-counter and down-counter command registers 402 and 406 (the X and Y departures), the multiplication gates 403 and 405 respectively gate out the appropriate component velocities on count-up summation line 454 and count-down summation line 455. The signals are representative to the velocities in the Y and X directions respectively and consequently, must be gated to the appropriate phase counters.

The signal appearing on the summation line 454 and 455 consists of a plurality of pulses similar to that appearing on the input lead 36. They occur with a frequency determined by the numbers appearing in count-up and count-down command registers 402 and 406, and approximately at the times of the clock pulses occurring on lead 81. It will be recognized, however, that due to slight delays in the multiplicity of gates appearing in the multiplication gates 403 and 405 (specifically illustrated in conjunction with velocity command 29), this timing is not accurate; consequently, re-synchronizing flip-flops 456 and 457 are provided.

The input to re-synchronizing flip-flop 456 consists of clock pulses on lead 81 as triggering inputs, and the output appearing on count-up summation line 454 and its complement as steering inputs. The output pulses on count-up summation line 454 are applied directly to terminal 456a and to an inverter 510. The inverted signal, the complement of the signal on summation line 454, is applied to terminal 456b. The transfer reset signal appearing on 451, and described above, is applied to terminal 456f as an electronic reset. Re-synchronizing flip-flop 457 has similar connections under the control of the output pulses from count-down summation line 455 and clock pulses on line 81. These re-synchronizing flip-flops change state in response to the appearance of an output gating pulse on the summation lines during occurrence of a timing pulse on lead 81, and provide binary "0" outputs from terminals 456h and 457h in response thereto. The effect of this arrangement is to delay the output pulses until the next succeeding clock pulse on lead 81, and to re-synchronize the output pulses with the clock pulses.

The outputs from terminals 456h and 457h are applied over conductors 458 and 459 respectively to switching circuit 463 which is adapted to connect them to the appropriate X-axis and Y-axis distance counters and command phase counters.

During linear interpolation, the output from count-up summation re-synchronizing flip-flop 456 is connected to the Y-axis control circuitry and the output from count-down re-synchronizing flip-flop 457 is connected to the X-axis control circuitry. This is accomplished by generating a binary "0" on lead 492 from generator control 490 and its complement, binary "1," on lead 493. These signals appear in response to detection of the letter address g1 on any block of data. Examination of gating circuitry 463 will show that under the described conditions of leads 492 and 493, the "0" output pulses from count-up multiplication gates 403 are applied to Y-axis command phase counter 31 and Y-axis distance counter 42, whereas the "0" output pulses from count-down multiplication gates 405 are applied to X-axis command phase counter 32 and X-axis distance counter 42'. Thus, the appropriate component velocities are directed to the correct control circuits.

The function generator will deliver the same component command pulse rates until both the X and Y axis distance counters 42' and 42 indicate that sufficient pulses to command the desired cut from B to C have been generated. At that time pulse generation is stopped and the next block of data is transferred into the command registers. In this case, the next cut is circular.

The circular cut programmed between points C and D, as shown in FIG. 2, appears in the fourth quadrant and is in a counter-clockwise direction; consequently, the Y Arc Center Offset data (3.7500) is stored in the buffer storage units 407 associated with count-down command register 406 and the X Arc Center Offset data (1.5000) is stored in buffer storage unit 401 associated with count-up command register 402. In response to the letter address g3, associated with this block of data, control circuitry 490 generates a binary "0" on lead 449 which, as will soon be described, effectively cross-connects the up-counter 402 and down-counter 406. Thus, as pulses are counted by pulse rate multiplier reference counter 404, output pulses will be generated on the respective summation lines of the count-up and count-down counters for application to the Y-axis and X-axis phase command counters 32 and 31. Because the X velocity must decrease towards zero as a position corresponding to 360 degrees is attained, the output of count-down summation line 455 is connected to X-axis command phase counter 32 and because the Y velocity must increase to a positive maximum as a position corresponding to 360 degrees is attained, the output of count-up summation line 454 is connected to Y command phase counter 31 under these conditions.

In general, the type of operation desired has been described. The unique control circuitry to accomplish the desired operation without unwanted ambiguity will now be examined.

The actual setting of the function generator for circular interpolation is similar to the setting for linear interpolation. These differences that exist are due to the selective use of the command storage registers as counters. First, the quadrant and direction of generation data contained in the program selection letter address and the polarities of the X and Y departure is used to generate the enabling addresses that direct the Arc Center Offset numbers to the appropriate counter. Second, the program selection letter address is used to develop a signal to cross-connect the command registers. Third, the program selection letter address and the polarities of the X and Y departures is used to generate signals for controlling connecting circuitry 463 in FIG. 7 to connect the correct control circuits to the function generator outputs. Whereas the means of generating these signals and addresses is not unique to the invention, the means for implementing the desired operations are.

The development of proper addresses to direct the X and Y Arc Center Offset numbers to the appropriate counters, and their storage therein, has been previously described. Also, the control of connecting circuitry 463 by signals on leads 492 and 493, has been described.

In order to cross connect the outputs of the command registers 402 and 406, during circular interpolation, lead 449 is placed in a binary "0" condition. This causes the various NOR gates appearing on the left of FIG. 7 to couple the outputs appearing on summation lines 454 and 455 to the respective count inputs of the least significant decades 434 and 429 of count-down register 406 and count-up register 402. Thus, NOR gate 484 provides a binary "1" output in response to an output on summation line 455. This "1" is inverted in inverter 485 and applied directly to the count input steering gate of decade 429. The subsequent appearance of a clock pulse on lead 81 causes count-up command register 402 to increase its registration by one decimal digit.

NOR gate 483 interconnects count-up summation line 454 with the steering gate input of decade 434 in the count-down register 406. NOR gate 483 has three inputs: one from summation line 454; one from zero recognition gate 473 of the count-down register; and one from control lead 449. Assuming count-down register 406 is not at zero, when control lead 449 indicates circular interpolation by a binary "0" all output pulses on count-up summation line 454 cause a "1" output of NOR gate 483. This "1" output is inverted in inverter 487 and applied directly to the steering input of register 406 and is effective to cause a count-down of one decimal digit when a clock pulse appears on lead 81.

Upon completion of each of these preparatory activities the function generator is set and ready to perform circular interpolation in response to velocity command signals supplied from velocity command 29 over input lead 36. Recall that the Y Arc Center Offset data, 3.7500, is now in count-down register 406 and that the X Arc Center Offset data, 1.5000, is in the count-up command register 402. As pulses are applied over lead 36 they are used as a steering gate to stage 410 of PRM counter 404. Just as described in connection with linear interpolation, the PRM counter responds to the 50 kilocycle clock pulses on lead 81 whenever an input gate pulse is applied via lead 36. Each time the number stored in either register 402 or 406 causes a pulse to be gated by the multiplication gates 403 or 405, the number stored in the opposite register is modified by one digit. Operation continues until the registers reach zero or maximum registration, or until the departure values registered in the distance counters are reduced to zero. Circular motion may be started or stopped at any angle in any quadrant by inserting appropriate starting point Arc Center Offsets in command registers 402 and 406 and appropriate departure distances in distance counters 42 and 42'.

In the cut from points C and D in FIG. 2, the Y velocity varies in accordance with, the sine of the angle whereas the X velocity varies in accordance with the cosine of the angle; consequently, the output appearing on count-up summation line 454, which is commensurate with the required velocity in the Y direction, must be supplied to Y-axis distance counter 42 and Y-axis command phase counter 31. Also, the signal appearing on the count-down summation line 455 must be applied to X distance counter 42' and X-axis command phase counter 32. This interconnection is accomplished in accordance with signals on leads 492 and 493 generated responsive to the aforecited quadrant and generation direction information. Consider the NOR gate configuration appearing in the upper portion of FIG. 7. This configuration illustrates a first NOR gate 460 having inputs from the count-up re-synchronizing flip-flop on line 458 and from lead 492. It will be understood that when both these leads present the binary digit "0," a "1" output appears on output lead 464 for application as an input to NOR gate 462. A second NOR gate 461 having as one input the signals from the count-down re-synchronizing flip-flop on line 459, and as the other input, the signal on lead 493. When both of these latter-mentioned leads present the binary digit "0," a "1" will appear on the output lead 466 of NOR gate 461.

In order to cause Y distance counter 42 to count down (its normal operation), it is necessary to apply "0" pulses to the input thereof. The same situation is, of course, true with respect to X-axis distance counter 42'. In carrying out the invention, application of the outputs from either the count-up or count-down re-synchronizing flip-flop 456 or 457 to the distance counters is made in accordance with the condition of leads 492 and 493. In order to connect the count-up lead 458 to supply counting pulses to the Y-axis distance counter 42, the commands on leads 492 and 493 must be "0" and "1," respectively. Under these conditions, NOR gate 460 has "0" applied to both of its two inputs whenever a count-up pulse appears on count-up lead 458. The effect of such an input condition is to provide a "1" on output lead 464 which is applied as an input of NOR gate 462. Presence of "1" on the input of NOR gate 462 will insure a "0" on the output 465 of NOR gate 462. The output on lead 40 is, effectively, the output of one section of the function generator and, in the present case, represents the output on the count-up summation line 454. The appearance of a "0" thereon causes the Y-axis distance counter 42 to count one digit because it is applied ot the input of NOR gate 468, the other input of which is always at a "0" with the exception of the time at which the Y-axis distance counter 42 registers the decimal digit 00,000. Thus, the appearance of "0" on the two inputs of NOR gate 468 provides it with a binary "1" output which is inverted by inverter 467 and applied to count down the Y-axis distance counter. Note that application of "1" on lead 493 to one of the inputs of NOR gate 461 insures that the output thereof will always be "0" irrespective of the condition of count-down lead 459 and consequently, only the output of the count-up multiplication gates 403 is connected to the Y-axis command circuits.

The gating circuitry interconnecting X-axis distance counter 42' to the outputs of the function generator is essentially the mirror image of that already described. When lead 492 is at "0" and lead 493 is at "1," the count-down summation output on lead 459 is interconnected to count down X-axis distance counter 42'. Reversal of the conditions of the inputs 492 and 493 is under the control as previously described, of control circuitry 490 that is responsive to data block 21. More specifically, the condition of leads 492 and 493 is a function of the quadrant and direction of rotation of the particular circle being generated. Reversing the binary conditions of leads 492 and 493 is effective to reverse the interconnections so that the output on count-up lead 458 is applied to count down X-axis distance counter 42' and the output of count-down lead 459 is applied to count-down Y-axis distance counter 42. The outputs appearing on leads 465 and 453 are also, it is understood, applied to the command phase counters associated with the appropriate axes in order to control the velocity of tool feed mechanisms in the desired fashion.

Several arrangements within the function generator 37 have not yet been described in detail and these particular arrangements are essential in order to provide proper operation.

*Circle function overflow*

Figure 3:
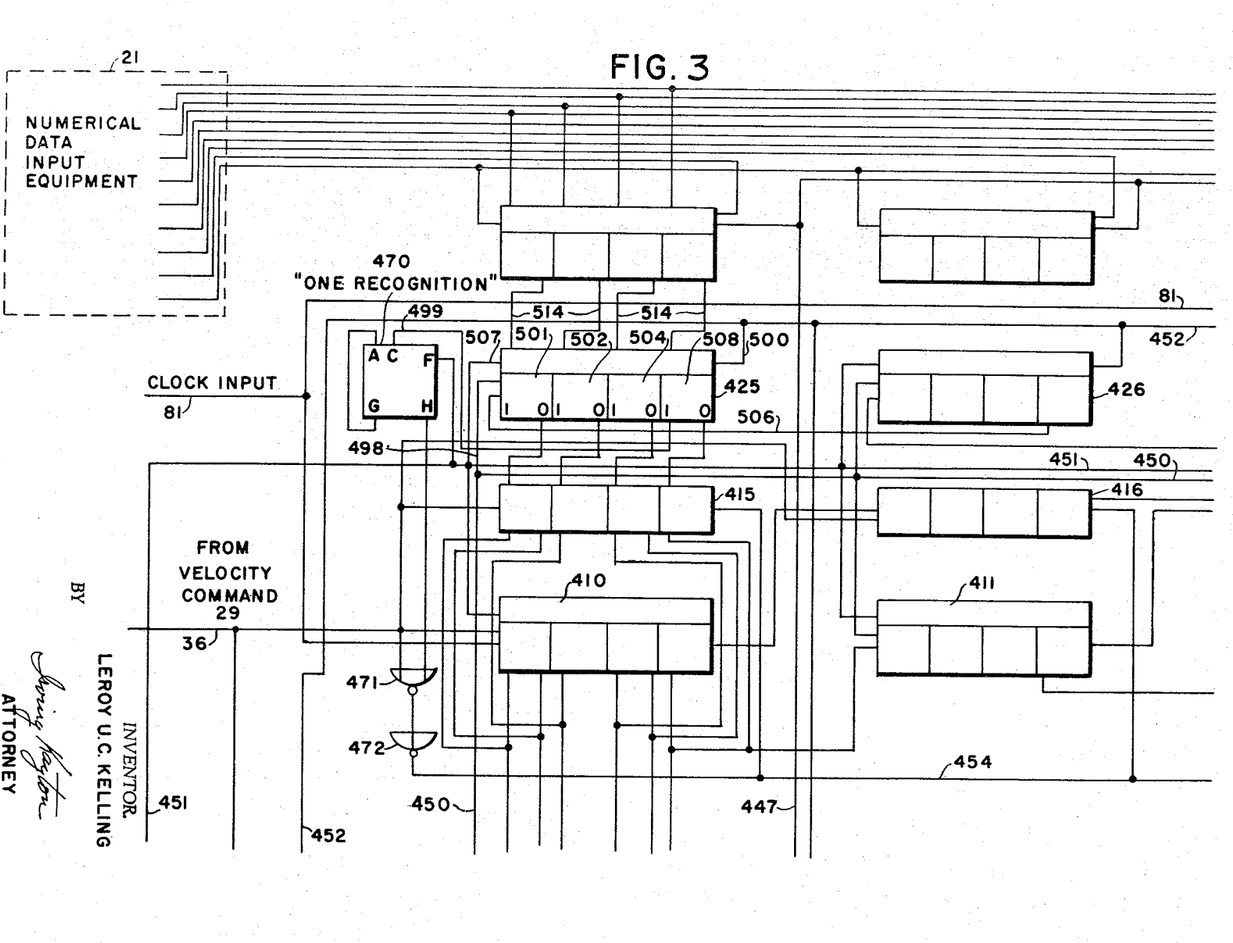
FIGS. 3 through 7, when taken together as shown in FIG. 7A, comprise a detailed logic representation of the elements used to generate X and Y velocity command signals, specifically illustrating the novel use of simple count-up and count-down registers for circular interpolation and novel means of handling circle function overflow.
Figure 4:
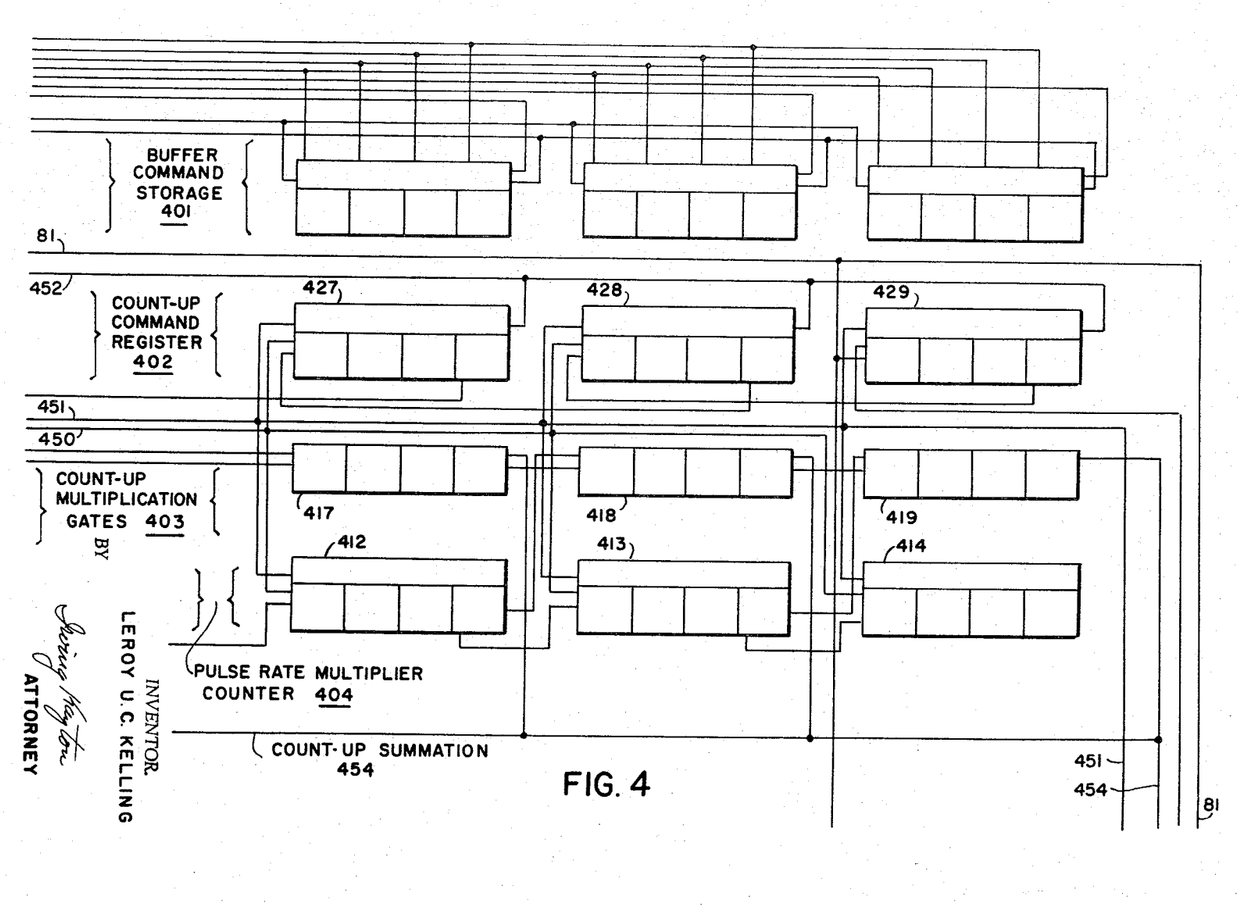
Figure 5:
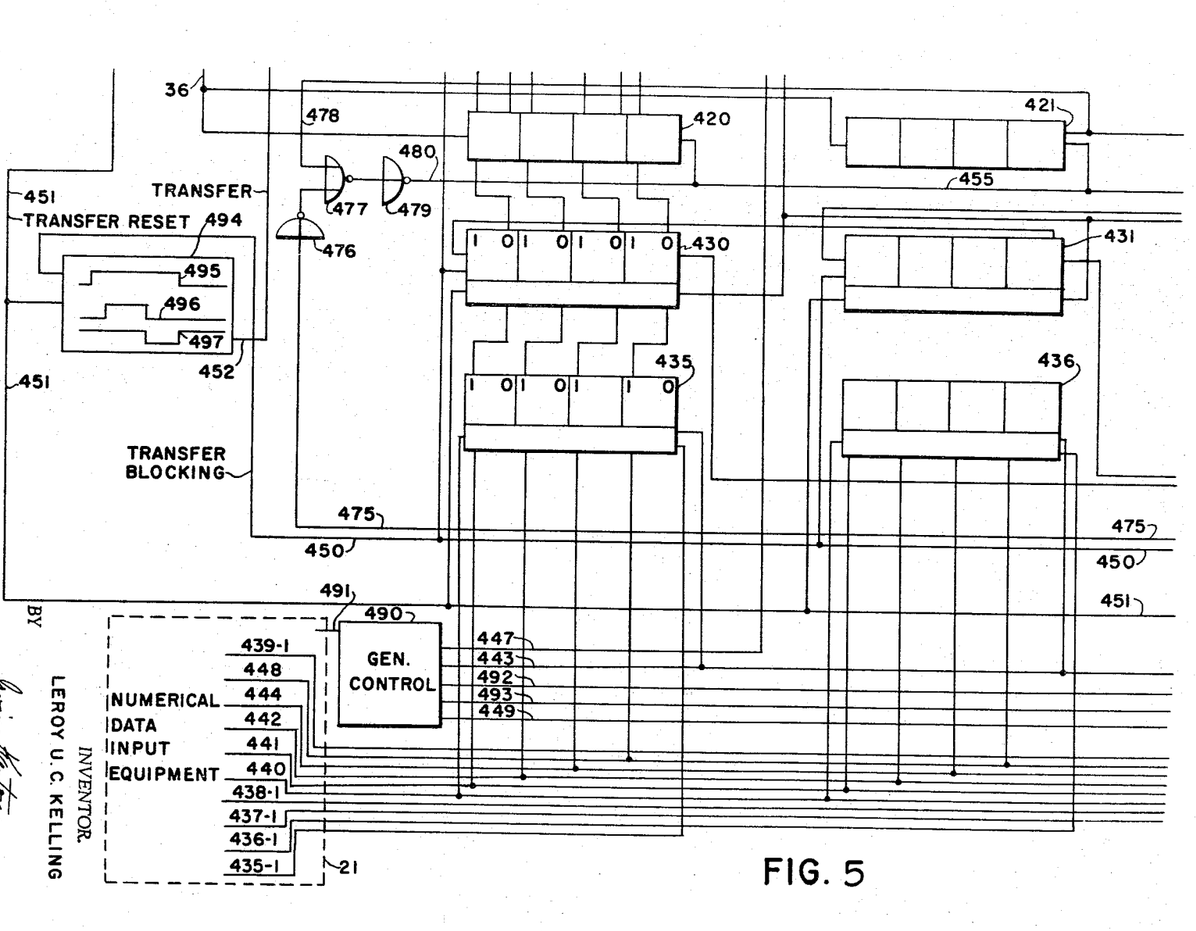
Figure 6:
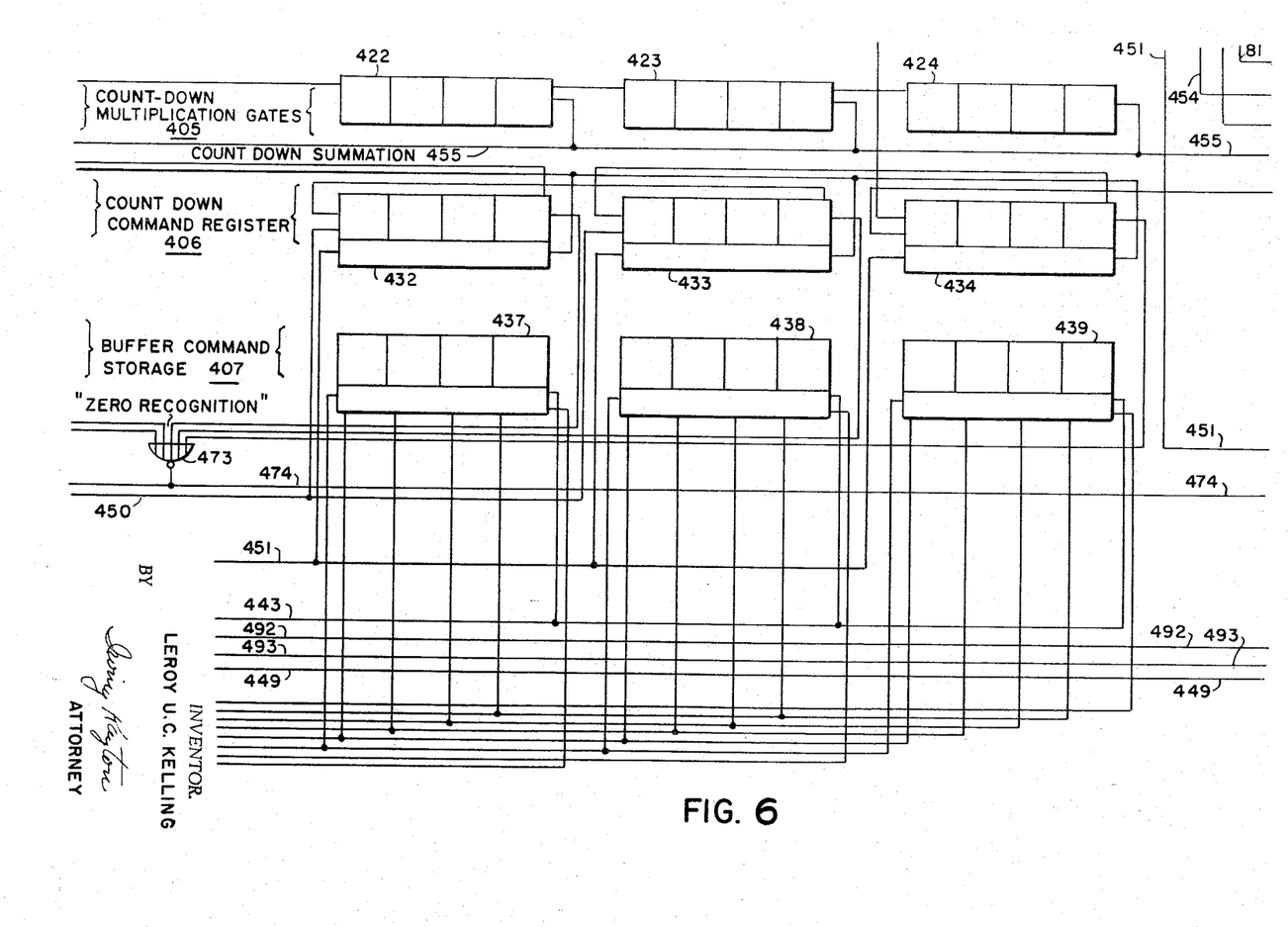

The first of these arrangements is a "one recognition" circuit which consists of flip-flop 470 appearing on the left-hand side of FIG. 3. A "one recognition" circuit is required, during circular interpolation, in the event count-up command register 402 reaches its maximum counting capacity of 99,999 before the distance counter with which it is associated commands a cessation of operations. In this event, the succeeding gate pulses being delivered over lead 36, are gated directly onto count-up summation line 454 prescribing a maximum velocity of motion in the direction currently being controlled by count-up command register 402.

"One recognition" flip-flop 470 is triggered to a "1" state whenever the five decades 425 through 429 of up-counter 402 go from the decimal state 99,999 to 00,000. This flip-flop is connected to a NOR gate 471 which passes all input signals from velocity command 29 on lead 36 to the count-up summation line whenever the flip-flop is in a "1" state. Triggering pulses are applied to terminal 470c from the 8 stage of most significant decade 425 of count-up register 402. Terminals 470g and 470a are directly connected together and terminal 470h is connected to one input of NOR gate 471 the other input to which, is the input gate signal on lead 36. At the commencement of each cycle when the transfer reset pulse is applied to lead 451, one recognition flip-flop 470 is set to a 0 state by application of the transfer reset binary "1" to electronic set terminal 470f. Thus, during normal operation the output from terminal 470h is a "1." Upon the switching of the most significant digit stored in decade 425 from a "1" in the 8 stage to a "0," a pulse is applied to trigger one recognition flip-flop 470 to the 1 state, thereby applying a "0" to the input of NOR gate 471. This "0," in conjunction with the "0" signals appearing on input gate lead 36 develop "1" outputs which are inverted by inverter 472 and applied directly to count-up summation line 454.

The problems of cumulative error when performing circular interpolation were described early in the specification. Employment of "one recognition" flip-flop 470 insures that the departure controlled by the count-up portion of the function generator is completed in all instances. Although slight deviations from the desired contour may arise, there will be no accumulation of error from one block of instructions to the next. It is also possible that count-down command register 406 will exhaust its counting capacity before the motion it is commanding has resulted in a correct departure of cut. A "zero recognition" circuit alleviates this problem.

The "zero recognition" circuit consists of a multiple input NOR gate 473 having outputs from the individual decades 430 through 434 connected as inputs thereto. When each decade registers a zero decimal digit, all inputs to NOR gate 473 are at a binary "0" and a binary "1" appears at the output thereof. This '1" is applied over conductor 475 and inverted by inverter 476 to apply a "0" to one input of NOR gate 477. A second input to NOR gate 477 is extracted, on lead 478, from the pulse rate multiplier gate 405 at a point which provides a "0" once out of every ten input pulses from velocity command 36. This input is shown as being connected to the "carry" lead between multiplication gates 421 and 422. Thus, when the "zero recognition" gate detects a decimal zero in the count-down command register 406, every tenth pulse from the velocity command 29 is effective to produce a "1" at the output of NOR gate 477. This "1" is inverted by inverter 479 and appears at the output thereof as a binary "0". It will be noted that lead 480, the output of inverter 479, is in fact the count-down summation line 455 and consequently, the count-down command register 406 has been counted down to a complete zero condition pulses are applied at a decreased rate to count-down summation line 455 until the distance counter signifies that the proper distance has been moved.

The preceding discussion described the use of up-counters and down-counters, as command storage registers. It is within the skill of persons competent in the art to develop numerous counters that may be employed in the system taught; however, typical counters, for use directly in the function generator described, are illustrated in FIGS. 8 and 9.

*Typical counters*

The gated count-up counter shown in FIG. 8 is a binary-coded-decimal counter having a 1–2–4–8 pattern that is arranged to count decimally from 0 to 9 and recycle to 0. The counter is triggered by clock pulses that are applied via lead 520 to trigger terminals 521c and 521d of the first flip-flop 521. It will be noted that four flip-flop stages 521, 522, 524, and 528, are employed. An enabling gate signal is applied via lead 523 to steering NOR gates 525 and 527. A second input to these NOR gates is applied by either output terminal 521g or 521h of the flip-flop. Inverters 526 and 529 connect the outputs of NOR gates 525 and 527 respectively to input steering terminals 521a and 521b of flip-flop 521. Thus, flip-flop 521 changes state each time a "0" appears on input lead 523 and a clock pulse appears on trigger lead 520. Unless input lead 523 has a "0" condition thereon, no count will be registered.

The output at terminal 521g, when flip-flop 521 is switched to a zero state, is applied to terminals 522cd of flip-flop 522 as a trigger pulse. Flip-flop 522 switches to the one state in response to this pulse. When reset to zero, subsequently, the output of flip-flop 522 triggers flip-flop 524, which in turn triggers flip-flop 528 when reset to the zero state. The input NOR gate 530 to the steering terminal 522a of flip-flop 522 is so connected that it blocks flip-flop 522 from responding to switching of flip-flop 521 when flip-flop 528 is in a one state. Thus, it prevents flip-flop 522 from assuming a one state upon the tenth count when it should remain in the zero state. Of course, a group of four bistable stages such as illustrated herein is basically a sixteen counter; however, two-input NOR gate 530 converts it to a count-of-ten counter.

To register a particular number in the up-counter of FIG. 22, each stage is initially reset to zero by application of a binary "1" via lead 532 to the electronic set terminal F of each flip-flop. Following reset, the individual stages are set in accordance with the complement of the binary value on leads 533–536 by applying a binary "0" on transfer lead 537. NOR gates 538, 539, 570, and 571 connected to electronic set terminals E implement this gating in an obvious fashion. The state of each stage 521, 522, 524, and 528 may be applied via leads connected to the respective G and H terminals thereof to any desired succeeding circuitry.

The gated count-down counter shown in FIG. 9 is a binary-coded-decimal counter having a 1–2–4–8 pattern that is arranged to count decimally from 9 to 0 and recycle to 9. Four flip-flop stages 541, 542, 544, and 548 are used in this counter. It is triggered by positive clock pulses applied via lead 540 to trigger terminals 541c and 541d of the first flip-flop 541. As in the case of the count-up counter, an enabling gate signal is applied via lead 543 to steering NOR gates 545 and 547. The second input to these NOR gates is applied respectively by output terminals 541g or 541h. Inverters 546 and 549 connect the outputs of NOR gates 545 and 547 respectively to input steering terminals 541a and 541b of flip-flop 541. Thus, flip-flop 541 changes state each time a "0" appears on gating lead 543 and a clock pulse appears on trigger lead 540. Unless input lead 543 has a "0" condition thereon, no count will be registered.

Assuming all stages 541, 542, 544, and 548 initially reside in the zero state, when flip-flop 541 is switched to the one state, the output pulse appearing on lead 541h is applied as a triggering pulse to flip-flops 542 and 548. Four-input NOR gate 565 provides a discrete "1" output only when all four stages are in the zero state. This "1" output is inverted by inverter 566 to provide a "0" to steering input A of flip-flop 548. Simultaneously, this "1" output is applied as an input to NOR gate 550 insuring a "0" output therefrom, producing a "1" signal on steering input A of flip-flop 542 due to the intervention of inverter 551. These signals permit the trigger output from flip-flop 541 to trigger flip-flop 548 while blocking a similar triggering of flip-flop 542. In response to the first input pulse therefore the decade resides in a decimal nine condition (1001). Following the 1–2–4–8 pattern, down-counting in response to succeeding input gates and triggering pulse continues in conventional fashion.

In a fashion similar to that described in conjunction with the count-up counter of FIG. 8, to register a number in the count-down counter, a binary "1" is first applied to reset lead 552. This lead is connected to all electronic set inputs E and consequently, all flip-flops assume the one state. Following reset, the individual stages are set in accordance with the complement of the binary values on leads 553–556 by applying a binary "0" to transfer lead 557. NOR gates 558–561, connected to electronic set terminals F implement this gating in an obvious fashion. The state of each stage 541, 542, 544, and 548, may be extracted via leads connected to the respective G and H terminals thereof.

In recapitulation, the detailed logic circuitry involved in function generator 37, has been fully described. As disclosed, means are provided for utilizing an up-counter 402 and a down-counter 406 in individual pulse rate multiplier systems in order to generate the necessary sine and cosine functions required for circular interpolation. The utilization of such counters has required that unique circuitry be employed to selectively connect the outputs from the respective counters to the proper X and Y distance counters and command phase counters and to selectively interconnect the counters during circular interpolation. Whereas the signals employed to control these unique gating means may be developed in accordance with known techniques, the utilization in this fashion of up-counters and down-counters permits the efficient generation of circular command signals with a minimum of circuitry. The disclosed logic has also included unique means for avoiding error in the concluding points of each path cut. If the controls generated by either the X or Y-axis command counters do not move the tool feed mechanism a sufficient amount to yield the total displacement required, special gating means are provided for generating additional pulses until the final point is attained. Only when the exact final position is attained, is the command received from the distance counters which will permit further tool feed mechanism displacement in response to new data.

Figure 10:
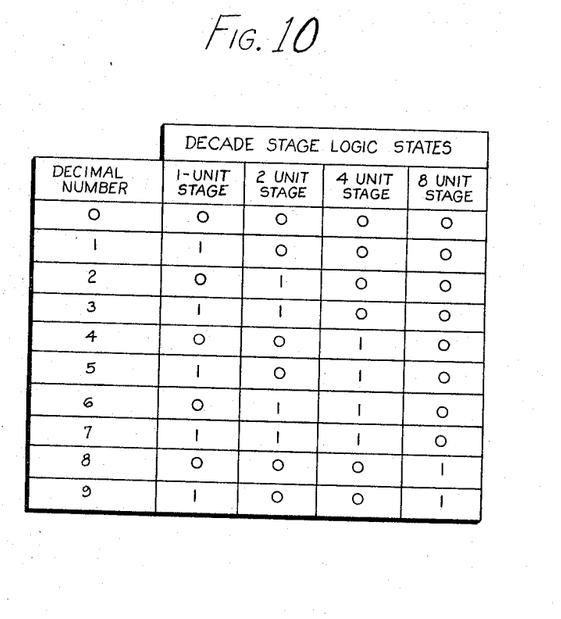
FIG. 10 is a table of binary-coded-decimal states of a decade representing decimal digits.

In FIG. 10, the left-hand column represents the decimal numbers 0 through 9 that may be represented in the second decade by logic state permutations in binary-coded-decimal form. Counting from 0 through 9 is achieved by pulsing the input stage 711 ten times, successively. The second through fifth columns of FIG. 24 represent the states of the four counter stages of the decade for the decimal digits 0 through 9. Thus, each row of FIG. 10 commences with a decimal number followed by a permutation of four logic states for the four binary stages which constitutes the binary-coded-decimal representation for that decimal number.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim as new and desire to secure by Letters Patent of the United States is:

1. In a system for generating a contour at a given velocity, means for developing control signals representative of orthogonal components of said given velocity, generation means controlled by said control signals to generate said contour, and end closure means operative to terminate further control signals in the direction of either of said orthogonal components of velocity upon completion of sufficient motion in a particular direction to generate said contour, means operative upon termination of said control signals before operation of said end closure means to deliver a discrete signal to said generation means until sufficient motion occurs to complete said contour.

2. In a system for performing circular interpolation, first counting means set to a number functionally related to the sine of an angle, second counting means set to a number functionally related to the cosine of said angle, means operative in response to a signal having a fixed repetition rate and controlled by said first and second counting means to produce first and second signals having a repetition rate commensurate with the numbers set in said first and second counting means respectively, means operative to increase the number set in said first counting means at the rate of said second signal, means operative to decrease the number set in said second counting means at the rate of said first signal, means operative to supplement said first and second signals by adding thereto supplemental signals whenever said first counting means attains a number equivalent to the sine of 90° and said second counting means attains a number equivalent to the cosine of 0° at non-coincident times, and circle generating means operative to move in orthogonal directions at velocities individually determined by the repetition rate of said first, second and supplemental signals.

3. In a system for performing circular interpolation, first counting means set to a number functionally related to the sine of an angle, second counting means set to a number functionally related to the cosine of said angle, means operative in response to a signal having a fixed repetition rate and controlled by said first and second counting means to produce first and second signals having a repetition rate commensurate with the numbers set in said first and second counting means respectively, means operative to increase the number set in said first counting means at the rate of said second signal, means operative to decrease the number set in said second counting means at the rate of said first signal, means operative to stop movement of said circle generating means in either orthogonal direction in accordance with predetermined conditions, means operative to supplement said first or second signal by adding thereto supplemental signals whenever said first counting means attains a number equivalent to the sine of 90° or said second counting means attains a number equivalent to the cosine of 0° before said predetermined conditions are satisfied, and circle generating means operative to move in orthogonal directions at velocities individually determined by the repetition rate of said first, second and supplemental signals.

4. In a system for performing circular interpolation, first counting means set to a number functionally related to the since of an angle, second counting means set to a number functionally related to the cosine of said angle, a source delivering pulses at a fixed rate, means jointly responsive to said pulses and the numbers set in said first and second counting means to produce impulses at a first and second rate equal to the individual product of said fixed rate and said first and second numbers respectively, means for increasing the number set in said first counting means by an increment in response to each impulse occurring at said second rate, means for decreasing the number set in said second counting means by an increment in response to each impulse occurring at said first rate, controlled means operative to move in orthogonal directions at velocities individually determined by the rates at which said impulses are produced, means operative to stop movement of said controlled means in a first direction or in a second direction orthogonal thereto upon occurrence of a predetermined number of impulses at the rate determining the volocity of motion in the particular direction, and means for supplying said fixed rate pulses to said controlled means in place of said first and second rate pulses whenever said first or second counting means registers numbers equivalent to the sine of 90° or cosine of 0° respectively prior to occurrence of said predetermined number of impulses for the controlled orthogonal direction.

5. In a circle generating system, an up-counter of limited capacity set to a number equivalent to a first component velocity of the total velocity of circle generation, a down-counter of limited capacity set to a number equivalent to a second component velocity of the total velocity of circle generation, said second component being orthogonal to the first component, individual means associated with each counter and responsive to the numbers set therein to provide pulse trains having a rate commensurate with the numbers in the associated counter, means interconnecting said individual means with the input of the non-associated counter to increase the number set in said up-counter and to decrease the number set in said down-counter at rates commensurate with the rate of the pulse train from the connected individual means, and controlled means controlled by said individual means, operative to move in a first direction at a velocity determined by the pulse rate from one of said individual means and in an orthogonal direction to said first direction at a velocity determined by the pulse rate from the other of said individual means, means operative to stop motion of said controlled means in said first or said orthogonal direction upon occurrence of a predetermined number of pulses from the individual means controlling motion in the particular direction, and means for supplying pulses to said controlled means at a fixed rate whenever said counters reach full capacity before the predetermined number of pulses from the associated individual means is provided.

6. In a system for generating circular motion at a given velocity in any quadrant and in either direction, ments for producing a first or second signal in accordance with the particular quadrant and direction of generation representing the direction of magnitude of change of orthogonal components of said velocity, a fixed capacity up-counter responsive to pulses to increase the number therein, a fixed capacity down-counter responsive to pulses to decrease the number therein, input means providing numerical data functionally related to the sine and cosine of the angle at which circle generation is to commence, means selectively responsive to said first or second signal to set said up-counter and said down-counter in accordance with either the numbers related to said sine and cosine respectively or the numbers related to said cosine and sine respectively, means controlled by the numbers in said up-counter and said down-counter to individually produce pulses at a first and second rate, said first and second rates being in the same ratio as the numbers set in said up-counter and said down-counter, means for applying the pulses occurring at said second rate to said up-counter to increase the number therein, means for applying the pulses occurring at said first rate to said down-counter to decrease the number therein, control means operative to move in orthogonal directions at velocities determined by the rates at which said pulses are produced, said control means comprises a first means for controlling motion in a first direction and a second means for controlling motion in a second direction orthogonal to said first direction, said first and second means being selectively responsive to said first and second signals to operate at velocities in accordance with either said first and second rate respectively at which said pulses are produced or at said second and first rate respectively at which said pulses are produced, means for controlling the amount of motion in said first direction and in said second direction in accordance with the number of pulses delivered to said first and second means respectively, means for terminating motion in said first and said second directions upon delivery of predetermined numbers of pulses to the associated one of said first or said second means, and means for supplying pulses at a fixed rate to said first and second means whenever the associated one of said counters reach full capacity before said predetermined number of pulses is delivered thereto.

References Cited by the Examiner
UNITED STATES PATENTS

| | | | |
|---|---|---|---|
| 2,833,941 | 5/1958 | Rosenberg et al. | 235—151.11 X |
| 2,875,390 | 2/1959 | Tripp. | |
| 3,062,052 | 11/1962 | Kolb | 235—132 |
| 3,064,169 | 11/1962 | Mynall | 318—28 |
| 3,079,522 | 2/1963 | McGarrell | 235—151 X |
| 3,093,781 | 6/1963 | Anke et al. | 318—467 X |
| 3,099,777 | 7/1963 | Davis | 318—28 |

OTHER REFERENCES

Gordon, B. M., Adopting Digital Techniques for Automatic Controls. In Electrical Manufacturing, November-December 1954.

References Cited by the Applicant
UNITED STATES PATENTS

| | | |
|---|---|---|
| 2,820,187 | 1/1958 | Parsons et al. |
| 2,833,941 | 5/1958 | Rosenberg et al. |
| 2,864,010 | 12/1958 | Rosenberg et al. |
| 2,896,514 | 7/1959 | Rosenberg. |
| 2,922,940 | 1/1960 | Mergler. |
| 2,927,735 | 3/1960 | Scuitto. |
| 2,933,249 | 4/1960 | Scuitto. |
| 2,943,248 | 6/1960 | Ritchey. |

OTHER REFERENCES

Electrical Manufacturing, November-December 1954, "Adapting Digital Techniques for Automatic Controls—I," B. M. Gordon.

MALCOLM A. MORRISON, *Primary Examiner.*

I. KESCHNER, *Assistant Examiner.*